US008445392B2

(12) United States Patent
Rosset et al.

(10) Patent No.: US 8,445,392 B2
(45) Date of Patent: May 21, 2013

(54) KNITTED STRUCTURE DESIGNED TO BE INCORPORATED IN A SHEET MATERIAL

(75) Inventors: Henri Rosset, Le Pin (FR); Sebastien Charignon, Saint Ondras (FR); Pierre Doublet, Saint Brice (FR)

(73) Assignees: Arjowiggins, Issy les Moulineaux (FR); Arjowiggins Security, Issy les Moulineaux (FR)

( * ) Notice: Subject to any disclaimer, the term of this patent is extended or adjusted under 35 U.S.C. 154(b) by 1212 days.

(21) Appl. No.: 11/632,350

(22) PCT Filed: Jul. 12, 2005

(86) PCT No.: PCT/FR2005/050577
§ 371 (c)(1),
(2), (4) Date: Oct. 16, 2007

(87) PCT Pub. No.: WO2006/016088
PCT Pub. Date: Feb. 16, 2006

(65) Prior Publication Data

US 2008/0107875 A1 May 8, 2008

(30) Foreign Application Priority Data

Jul. 15, 2004 (FR) ...................................... 04 51539

(51) Int. Cl.

| | |
|---|---|
| ***B32B 5/04*** | (2006.01) |
| ***B32B 5/08*** | (2006.01) |
| ***B32B 5/20*** | (2006.01) |
| ***B32B 3/18*** | (2006.01) |
| ***B44F 1/12*** | (2006.01) |

(52) U.S. Cl.
USPC ........... 442/308; 442/310; 442/312; 162/103; 162/109; 162/140

(58) Field of Classification Search
USPC .......................................... 442/308, 310, 312
See application file for complete search history.

(56) References Cited

U.S. PATENT DOCUMENTS

| | | | | |
|---|---|---|---|---|
| 1,921,504 | A | 8/1933 | Chase et al. | |
| 4,183,989 | A * | 1/1980 | Tooth | 428/195.1 |
| 4,313,984 | A | 2/1982 | Moraw et al. | |
| 4,462,867 | A | 7/1984 | Fuller | |
| 4,555,408 | A * | 11/1985 | Gregor et al. | 426/90 |
| 4,863,777 | A * | 9/1989 | Callaway et al. | 428/103 |
| 5,093,184 | A * | 3/1992 | Edwards | 428/195.1 |

(Continued)

FOREIGN PATENT DOCUMENTS

| | | | |
|---|---|---|---|
| DE | 198 09 085 | A1 | 8/1999 |
| DE | 19809085 | A1 * | 8/1999 |

(Continued)

OTHER PUBLICATIONS

Paugstadt, Ralf. DE 198 09 085 A1 Aug. 26, 1998. English Translation.*

*Primary Examiner* — Jenna Johnson
(74) *Attorney, Agent, or Firm* — Oliff & Berridge, PLC

(57) ABSTRACT

The invention concerns a sheet material, characterized in that it incorporates at least one knitted structure. The invention also concerns a document and a base fabric comprising said sheet material, as well as a method for making said material. The invention further concerns a knitted structure comprising at least one authenticating and/or identifying element, as well as a method for authenticating and/or identifying a document or a knitted structure.

48 Claims, 4 Drawing Sheets

Figure 1:
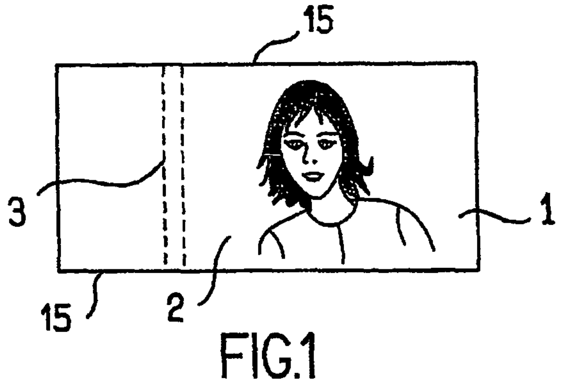

U.S. PATENT DOCUMENTS 5,314,739 A 5/1994 Teodoro Vidal
5,677,674 A * 10/1997 Wolf .............................. 340/541
5,955,172 A * 9/1999 Hurten .......................... 428/116
2003/0044575 A1* 3/2003 Hexels .......................... 428/131

FOREIGN PATENT DOCUMENTS

EP 0 229 645 7/1987
FR 646 709 A 11/1928
FR 1 263 931 A 6/1961
FR 2 114 705 A 6/1972
FR 2 117 055 A 7/1972
GB 1 118 045 6/1968
GB 1 365 876 9/1974
JP A 2000-025829 1/2000
WO WO 98/26379 6/1998

* cited by examiner

KNITTED STRUCTURE DESIGNED TO BE INCORPORATED IN A SHEET MATERIAL

The present invention relates particularly to a sheet material and to a document or printing substrate comprising or consisting of such a sheet material.

There is a need to further improve the protection of valuable or security documents against forgery.

Moreover, bank notes are often folded in use. This weakens them and can lead to them tearing after a certain period of use. There is thus also a need for mechanically reinforcing the security documents or valuable documents, particularly bank notes.

This invention is particularly designed to meet at least one of the above needs.

The subject of the invention, in one of its aspects, is a sheet material whose distinguishing feature is that it incorporates at least one knitted structure.

The expression "sheet material" may denote in the description and in the claims a sheet of paper and/or of plastic, having a composite or non-composite single-layer or multilayer structure. A sheet material may for example be of relatively small thickness, particularly less than or equal to 3 mm, for example equal to approximately 100 μm, and be flexible. In an illustrative embodiment of the invention, the sheet material may be stored in reel form before being cut to the desired dimensions.

The invention offers many advantages.

In the first place the knitted structure can be used, if desired, depending for example on its positioning, nature and dimensions, to provide mechanical reinforcement to the sheet material, and in particular reduce the risk of its tearing. This may be particularly useful for improving the mechanical strength of bank notes, for example. The fact that the structure is a knit means that it can if desired be produced with relatively large stitches, which can facilitate its incorporation into a papermaking stock.

Also, since the structure is a knit, it can exhibit some elongation in at least one direction, which can make it easier to incorporate it into a paper, for example. By selecting the design of the stitches, the knitted structure can be given the desired elongation to allow for example the incorporation of the structure into a fibrous layer during its manufacture on a papermaking machine. The elongation of the knitted structure will advantageously be sufficient to prevent the development of internal stresses that can damage the fibrous layer or the knitted structure itself, especially while the paper is being dried. The elongation may be, before the structure is incorporated in the sheet material, between for example approximately 1% and approximately 5%, e.g. at least approximately 1%, iridescence %, 3%, 4% or 5%, in a predetermined direction of elongation. If the knitted structure is in the form of a strip, this direction of elongation is advantageously parallel to the longitudinal direction of the strip, and this direction can be the same as that of the direction of travel of the knitted structure through the papermaking machine. The knitted structure can if desired be made in such a way that it can stretch in two different directions, such as two mutually perpendicular directions. For example, the elongation of the knitted structure may be at least 3% in a first direction and at least 1% in a second direction perpendicular to the first, before incorporation of the knitted structure into the sheet material.

In addition, it is possible with the invention, if desired, to incorporate into the structure a wide variety of yarns which may or may not possess in themselves the necessary stretchability, but give the structure the desired overall elongation.

The structure is advantageously knitted with at least five yarns, especially at least ten yarns, for example approximately twenty yarns.

The knitted structure may comprise for example at least one metal or metal alloy yarn, for example a yarn made of steel or of Permalloy-type alloy for the purposes of theft detection. The structure may also optionally incorporate at least one yarn intended for authentication purposes.

The knitted structure may be produced with different forms of stitches. This may make it possible for example to create specific designs which may contribute to making it more difficult to forge and/or help in identifying a document either by visual appearance or by touch, by visually impaired people for example.

The knitted structure may also be produced in a variable shape, for example a strip of non-constant width. This can be used to increase the options in terms of visual appeal, identification and/or authentication, in combination for example with other authenticating elements at least partly superposed on the knitted structure or integrated with it.

The knitted structure can have a mechanical reinforcement function and an authenticating and/or identifying function.

The knitted structure may comprise one or more plastic, especially polyamide, acrylic or polyester, yarns, or one or more yarns containing inorganic fibers such as glass or carbon fibers, or containing plant or animal material(s).

It is possible for all of the yarns of the knitted structure to be made from the same material, e.g. one of the abovementioned plastics, or, as a variant, the knitted structure comprises at least two yarns made from different materials. All of the yarns of the structure may for example be plastic, with the exception of one which is metallic. The greater the number of different yarns there are, the more the structure may be difficult to reproduce and therefore to counterfeit.

The knitted structure may be at least partly plain knit, single rib knit, full cardigan rib, half-cardigan rib, variure, guilloché knit, "8-lock" knit, interlock, weave-knit, jacquard knit, or purl knit, this list not being exhaustive.

In an illustrative embodiment of the invention, the knitted structure is configured to create on at least one outer face of the sheet material, especially on both outer faces of the sheet material, a texture that is perceptible to the eye and/or touch.

To enhance the authentication and/or identification of a document, the structure may comprise at least one authenticating and/or identifying element selected for example from: a falsification-evident element, especially one that is visible and/or detectable with the aid of a specific detector; an element producing a variable optical effect and/or an element producing an optical effect by diffraction, interference, iridescence or liquid crystals; a magnetic or crystalline coating; magnetic fibers; tracers detectable by magnetic resonance; tracers detectable by X-ray florescence; biomarkers; a varnish or ink; luminescent or florescent tracers; and photochromic, thermochromic, electroluminescent and/or piezochromic compounds and/or compounds that change color on contact with one or more predetermined products.

In one illustrative embodiment of the invention, the authenticating and/or identifying element is carried by at least one yarn of the knitted structure.

The structure may comprise at least one of the following yarns, and in particular a combination of these: a florescent or phosphorescent yarn; a magnetic yarn having properties of soft or hard magnetism; and a yarn that can be detected by exposing it to microwaves. Increasing the number of yarns with different properties can increase the security.

Since the authenticating and/or identifying element(s) can be incorporated on the yarns of the knitted structure, the invention makes it possible if desired to achieve a better visual or other rendering, and to obtain a more even and stable effect, especially where the authenticating and/or identifying elements, e.g. fibers or markers, are dispersed throughout the fibrous layer.

In an illustrative embodiment of the invention, the knitted structure is made with metallic yarns having properties of soft magnetism, for example of the type described with reference to patent application EP 897 569. This knitted structure may if desired be in the form of a strip with a width less than or equal to 1 cm, the yarns each having a diameter of between for example 20 μm and 30 μm.

The incorporation of this strip-shaped knitted structure into the sheet material makes it possible to produce a strip-shaped area on this material which is well-defined, contrasting in particular with a strip-shaped area formed in incorporating chopped fibers throughout the volume of the sheet material.

The knitted structure may comprise a combination of metallic yarns having properties of soft magnetism and one or more metallic or nonmetallic yarns of a different type, especially with other magnetic properties.

The knitted structure may contain all kinds of yarn, for example a flattened yarn, a yarn of star-shaped cross section, a textured yarn, a twisted yarn, or a monofilament or multifilament yarn, such as a double yarn.

One of the yarns of the structure may be composite, that is to say it may comprise at least two different materials, for example a core of one material and a sheath of another material. At least one yarn of the structure may in particular comprise a coating comprising an interferential multilayer, producing a color effect, this coating comprising for example a succession of layers with high and low refraction indices.

The knitted structure may comprise at least two yarns of different colors. The colors of the yarns of the structure can thus be used for authentication and/or identification. As a variant, all the yarns of the structure are the same color.

In an illustrative embodiment of the invention, the yarns of the structure exhibit, in for example a transverse direction when the structure is in the form of a strip, interlacings forming a code that can be detected, possibly by a specific detector of, in particular, optical type.

In an illustrative embodiment of the invention, the structure is knitted in such a way as to display at least one design, especially a drawing, a logo or a text. The design, drawing, logo or text may if desired repeat at regular intervals along the structure.

The type of stitch with which the structure is knitted may be changed, if desired, during knitting.

The knitted structure may have a thickness of less than or equal to 100 μm, especially less than 70 μm, for example less than or equal to 50 μm, and may for example be in the form of a strip, with in particular a width of less than 50 mm, in particular less than 20 mm, for example of between 5 and 30 mm, for example of between 5 and 15 mm, or between 10 and 20 mm, if it is to be used as a “security strip”. The knitted structure may also extend the full width of the sheet material, notably if the knitted structure is designed to reinforce it.

The thickness of the sheet material may be greater than that of the structure.

In an illustrative embodiment of the invention, where permitted by the type of yarns employed, the structure is at least partly heat-sealed, e.g. by hot calendering, to improve its dimensional stability and/or reduce its thickness. During heat-setting, the intersections of the yarns may fuse and solidify together.

The knitted structure may comprise a coating that at least partly covers it. The coating may comprise for example an adhesive to improve the bonding of the structure within the sheet material, for example a heat-sealable varnish. The coating may also comprise, if desired, particles, for example magnetic particles or pigments, for example iridescent pigments. The coating may also comprise an interferential multilayer structure, producing a color effect when observed through a window in the sheet material for example.

In an illustrative embodiment of the invention, the coating comprises a metal, for example aluminum or copper. The knitted structure may also be at least partly coated with an ink, such as an ink deposited by printing. The ink may contain at least one luminescent, florescent, photochromic, thermochromic electroluminescent and/or piezochromic compound.

The knitted structure may be at least partly embedded in a layer of the sheet material, this layer being in particular non-textile. This layer may for example be fibrous and may contain papermaking fibers, e.g. cellulose fibers and/or synthetic fibers.

If the knitted structure is at least partly embedded in a fibrous layer, it advantageously has stitches having a size chosen to allow the fibers to penetrate through the stitches, so as to ensure satisfactory cohesion of the fibrous layer and good attachment of the structure within the fibrous layer.

The stitches of the structure may form for example voids having an area of at least 0.1 $mm^2$, especially of at least 1 $mm^2$, for example of at least 5 $mm^2$, for example of at least approximately 9 $mm^2$ or 16 $mm^2$, or more, when the structure is flat and observed from above.

In an illustrative embodiment of the invention, the knitted structure comprises at least one portion embedded in at least one layer of the sheet material and at least one exposed portion, for example a succession of alternately embedded and exposed portions. The knitted structure may, in a variant, be completely embedded in the sheet material, or the full length of the structure may be flush with an outer face of the sheet material.

In an illustrative embodiment of the invention, the knitted structure is narrower than the sheet material. In a variant, the knitted structure may extend across the entire area of the sheet material, on its surface or not on its surface. The structure may in particular extend from a first edge of the sheet material to a second edge opposite the first edge.

The invention also relates to a document, especially a valuable and/or security document, comprising and/or consisting of a sheet material as defined above.

The document may be chosen from: a bank note; an identity paper such as an identity document; a driver’s license or a pass; a page or cover of a passport; a visa; a coupon; a valuable document other than a bank note, for example a cheque or a credit card; a protective and/or authenticating label; a traceability label; and an admission ticket for a cultural or sporting event.

The invention also relates to a printing substrate comprising and/or consisting of a sheet material as indicated above.

This printing substrate may consist of for example a writing paper, a printer paper, an envelope, or a paperboard, this list not being exhaustive.

The subject of the invention is also, in another of its aspects, independently of or in combination with the above, a knitted structure designed to be incorporated at least partly within a sheet material, the knitted structure including at least one authenticating and/or identifying element.

The subject of the invention is also, in another of its aspects, independently of or in combination with the above, a sheet material characterized in that it comprises at least one knitted structure comprising at least two yarns differing in size and/or shape and/or optical, physical or chemical properties, the knitted structure exhibiting, before being incorporated in the sheet material, an elongation of at least approximately 3% in a predetermined direction.

The subject of the invention is also, in another of its aspects, independently of or in combination with the above, a sheet material characterized in that it incorporates at least one knitted structure made with at least two different forms of stitch.

The subject of the invention is also, in another of its aspects, independently or in combination with the above, a sheet material characterized in that it incorporates at least one knitted structure extending across the whole area of the sheet material, the structure being knit in such a way as to form at least one design, this design having the appearance of for example a strip extending from a first edge of the sheet material to a second edge opposite the first.

The subject of the invention is also, in another of its aspects, a sheet material of essentially rectangular shape, characterized in that it incorporates at least one knitted structure extending along one side of the rectangle.

The sheet material advantageously incorporates two knitted structures arranged along two respective parallel sides of the rectangle.

The invention thus enables two or four corners of the sheet material, depending on the particular case, to be reinforced.

The subject of the invention is also, in another of its aspects, independently or in combination with the above, a sheet material comprising at least one structure of interlaced yarns, such as a knitted structure, the structure being narrower than the sheet material. Such a structure can be configured for example to create on at least one face of the sheet material, and in particular on two faces, a texture that is perceptible to the eye and/or touch, and may comprise if required at least one authenticating and/or identifying element.

The subject of the invention is also, in another of its aspects, a sheet material comprising a structure of interlaced yarns, especially a knitted structure, that is at least partly embedded in at least one layer, such as a fibrous layer, of the sheet material. Such a structure advantageously has stitches large enough to allow the fibers to penetrate through the structure. The stitches may form for example voids having an area of at least 0.1 $mm^2$, especially of at least 1 $mm^2$, for example of at least 5 $mm^2$, for example of at least approximately 9 $mm^2$ or approximately 16 $mm^2$, when the structure is flat and observed from above. The structure may extend across essentially the entire area of the sheet material, or, in a variant, only in a folding area of the sheet material, such as in a central area of the sheet material.

In an illustrative embodiment of the invention, the structure extends along at least one edge of the sheet material. The material may incorporate a single knitted structure or, in a variant, at least two knitted structures, for example a first knitted structure in a central area and second and third knitted structures essentially parallel to the first and extending along two opposite edges of the sheet material. In the case of a bank note, this can be done for example to reinforce the corners.

The subject of the invention, in another of its aspects, is also a method of producing a sheet material, comprising the following steps:

- forming at least one fibrous layer by a papermaking technique, for example by depositing fibers on a surface submerged in a dispersion of fibrous matter, and
- bringing a structure with interlaced yarns, especially a knitted structure, into contact with the fibrous layer, during or after its formation, and optionally forming at least one window, which may or may not be a through window, in which the knitted structure can be seen.

The subject of the invention is also, in another of its aspects, a method of producing a sheet material, comprising the following steps:

- forming a first stream of paper by depositing fibers on a first surface submerged in a dispersion of fibrous matter,
- forming a second stream of paper by depositing fibers on a second surface submerged in a dispersion of fibrous matter,
- bringing the structure between the first and second streams of paper, and
- assembling the first and second streams of paper in such a way that the structure is sandwiched between them, at least one of which streams of paper may comprise one or more areas of zero thickness, each area optionally alternating with or coinciding with an area of zero thickness in the other stream, and the knitted structure being visible through this area or these areas of zero thickness.

The subject of the invention is also, in another of its aspects, a method of producing a knitted structure designed to be incorporated in a sheet material, the method comprising the following steps:

- knitting a web that is wider than the structure,
- cutting the web to form the structure, the cutting being done for example by ultrasound.

In a variant, the structure is knitted in its final width, which makes it unnecessary to cut it up after knitting.

The structure may be subjected to a heat treatment, such as heat-setting, e.g. by hot calendering, before its incorporation into the sheet material.

In an illustrative embodiment of the invention, a coating is deposited on the already-knitted structure, particularly after an optional heat-setting. In a variant or additionally, a coating is deposited on at least one of the yarns of the structure, prior to knitting. The coating may be an ink deposited by printing, for example.

The subject of the invention is also, in another of its aspects, a method of authenticating and/or identifying a valuable and/or security document comprising a sheet material incorporating a knitted structure, the method comprising the following steps:

- acquiring at least one data item characteristic of the mesh of the knitted structure, for example, the type of stitch, the size of the stitches or the arrangement of the stitches, and
- verifying the authenticity and/or identity of the document from at least said data item.

It is for example possible to provide in two different documents, for example two different denominations of bank notes, knitted structures having different meshes, enabling the two denominations to be distinguished from each other.

If the yarns of the knitted structure interlace to form a code, the document can be authenticated and/or identified by determining the corresponding code.

The subject of the invention is also a method of authentification in which at least one yarn of the knitted structure is analyzed. Analysis may for example be optical, chemical, or mechanical, or even an analysis of the biological, electrical, or electromagnetic properties of at least one yarn.

Figure 2:
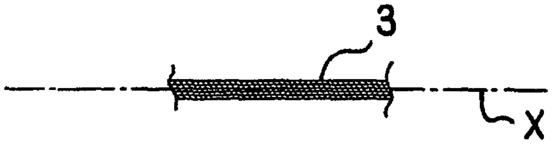
Figure 3:
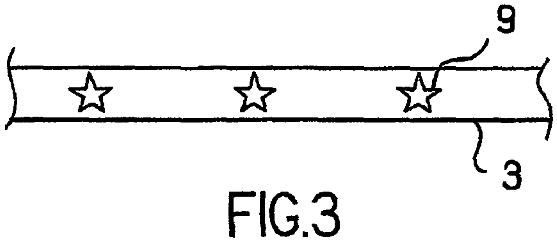
Figure 4:
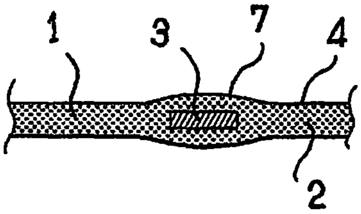
Figure 5:
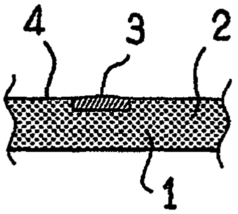
Figure 6:
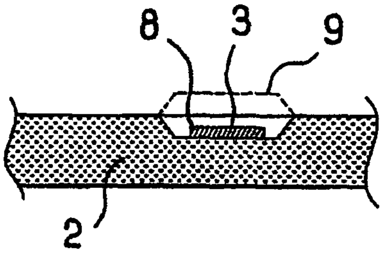
Figure 7:
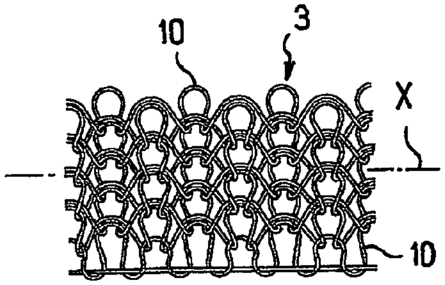
Figure 8:
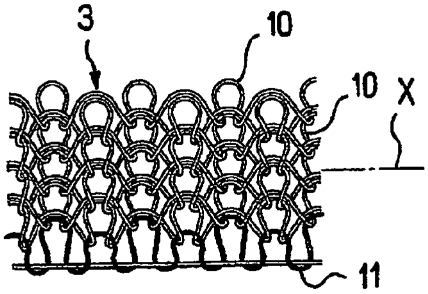
Figure 9:
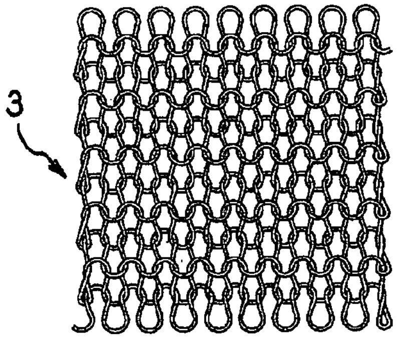
Figure 10:
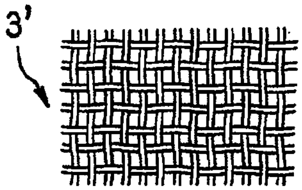
Figure 11:
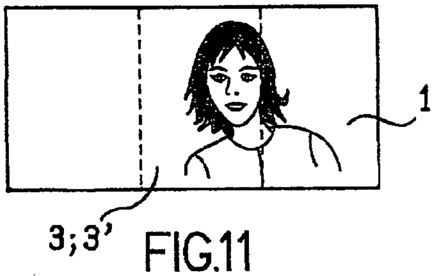
Figure 12:
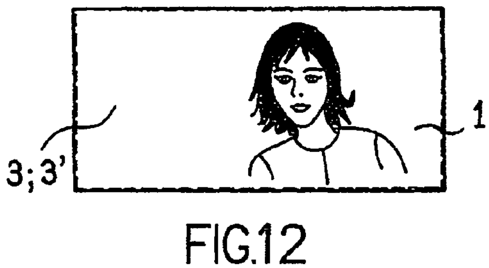
Figure 13:
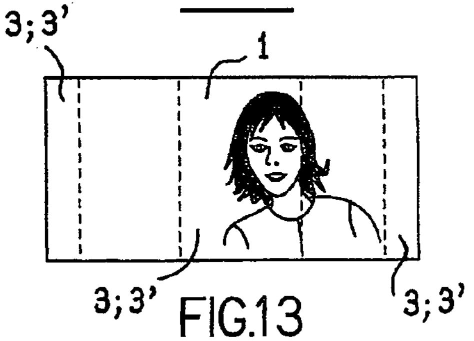
Figure 14:
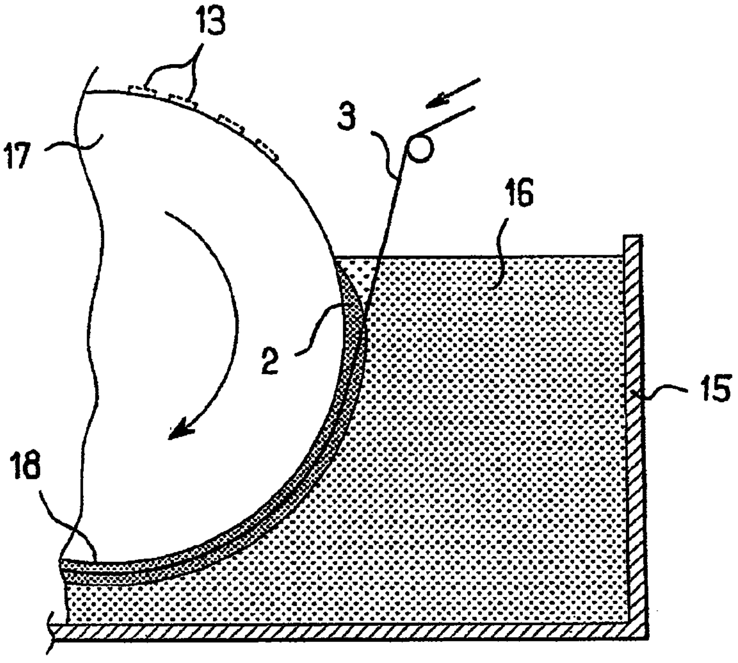
Figure 15:
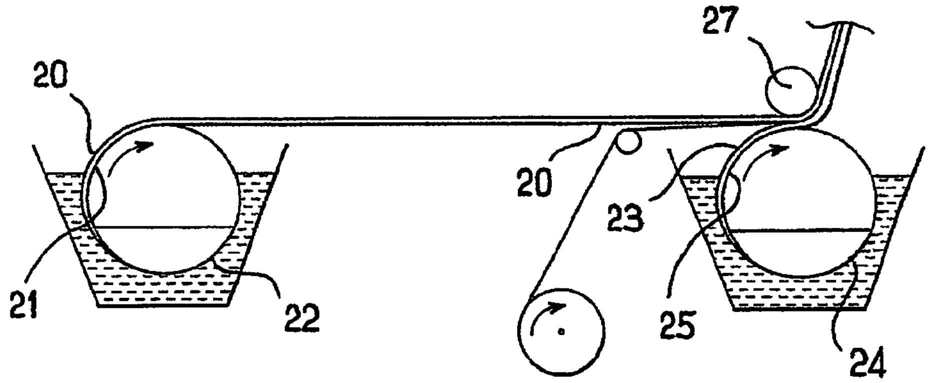

A clearer understanding of the invention will be gained from reading the following detailed description of various illustrative and non-limiting embodiments, and by examining the appended drawing, in which:

FIG. 1 is a schematic and partial view of an example of a document produced in accordance with the invention, FIG. 2 is a schematic and partial top view in isolation of the structure incorporated in the document shown in FIG. 1, FIG. 3 is a schematic and partial view of a knitted structure containing designs, FIGS. 4-6 are schematic and partial cross sections of documents, each in accordance with a different illustrative embodiment of the invention, FIGS. 7-9 are schematic and partial views showing the interlacing of the stitches of different knitted structures, FIG. 10 is a schematic and partial view of a detail of a knitted structure, FIGS. 11-13 are schematic and partial views of two documents in accordance with other illustrative embodiments of the invention, FIG. 14 shows schematically one step in a method of producing the document shown in FIG. 1, in an illustrative embodiment of the invention, FIG. 15 shows schematically one step in a method of producing a document in another illustrative embodiment of the invention, and FIGS. 16-21 are schematic views of documents in accordance with other illustrative embodiments of the invention.

In the drawing, for the sake of clarity, the relative proportions of the different parts depicted have not always been respected, the views being schematic.

FIG. 1 shows a document forming a sheet material within the meaning of the invention, for example a bank note, comprising a fibrous layer 2 in which a knitted structure 3 in accordance with the invention is incorporated.

The document 1 may be a security paper such as an identity paper, a passport, a visa, a coupon, a valuable document other than a bank note, a label for protecting against trademark forgery, or a traceability label.

As illustrated in FIG. 2, the knitted structure 3 may take the form of a strip of longitudinal axis X, having a width of less than the document 1, being for example approximately 15 mm or less.

Whatever the sheet material is in which it is incorporated, the structure 3 can be knitted in various ways. It may for example be a plain knit knitted on a single bed of a knitting machine.

In a variant, the structure 3 may be a ribbed knit formed simultaneously on two beds of a knitting machine.

Of the various types of rib stitch, a single rib with single stitches may be mentioned as an example.

The rib stitch may also be a full cardigan rib.

FIG. 7 is a diagram showing the interlacing of the stitches of a full cardigan rib with double stitches.

The rib knit may also be a half-cardigan rib, with courses of single rib alternating with courses of full cardigan rib.

The structure 3 may in a variant be knitted in such a way as to form a variure or a guilloché knit.

In another illustrative embodiment of the invention, the structure 3 forms an "8-lock" knit, for example an interlock knit, making it possible to produce striped or checked designs.

The structure 3 may also be formed by a weave-knit presenting a mixture of rib courses and plain courses.

To make the structure 3 with designs 9, for example drawings of stars, as illustrated in FIG. 3, the structure 3 may be knitted using an intarsia technique or a jacquard technique.

The structure 3 may also be knitted in purl, as illustrated in FIG. 9.

The invention is not of course limited to the abovementioned examples of knits, and other structures of interlaced yarns may also be suitable.

For knitting techniques, the reader may refer to the book "Cours de tricotage Dubieb", Edouard Dubieb, Neufchatel, Switzerland.

Before its incorporation in the document 1, the knitted structure 3 may exhibit an elongation along the X axis of at least approximately 3%, for example. The number of yarns in the knitted structure 3 may depend for example on such designs or elements of identification or authentication as it may be wished to incorporate. The knitted structure 3 may comprise for example at least five yarns, particularly at least ten yarns, and for example approximately twenty yarns.

The structure 3 may be knitted to its final width so that its width does not have to be reduced before incorporating it into the fibrous layer. In a variant, the final structure 3 is produced by cutting, e.g. by ultrasound, a knitted sheet of a width greater than the final width of the structure 3.

To improve the dimensional stability and/or reduce its thickness, the knitted structure 3 may undergo a heat treatment, for example may be heat-set by calendering, especially where the yarns used are thermoplastic.

The structure 3 can if desired be coated with an adhesive such as a heat-sealable varnish.

The structure 3 may be knitted from yarns of the same kind as illustrated in FIG. 7, or alternatively from several yarns of different kinds, in order for example to increase the number of security features.

The structure 3 comprises for example at least one of the following yarns:

a plastic yarn of e.g. polyamide, acrylic or polyester, a metallic yarn, of e.g. steel, a glass- or carbon-fiber type yarn, a plant- or animal-type yarn.

As illustrated in FIG. 8, the structure 3 may contain only polyamide yarns 10, with the exception of a metallic yarn 11, of steel for example, especially of a Permalloy type material, to allow detection by certain antitheft gates.

In the examples illustrated in FIGS. 7 and 8, the courses of stitches are generally parallel to the X axis.

The structure 3 may comprise yarns all of the same color or in a variant may comprise at least two yarns of differing colors.

Depending on how much security is desired, the structure 3 may comprise at least one of a florescent or phosphorescent yarn, a magnetic yarn having properties of soft or hard magnetism, and a yarn compatible with microwave detection.

The knitted structure 3 can be made for example from 19 yarns of polyester and one florescent yarn, each yarn having for example a diameter of about 33 μm and the knitted structure a thickness of approximately twice this diameter, that is approximately 66 μm It is possible to incorporate into the structure 3, on request, at least one authenticating and/or identifying element selected from one of the following elements: a falsification-evident element, such as one that is visible and/or detectable by a special detector, an element with a variable optical effect and/or diffractive, or iridescent, or a liquid-crystal element, a magnetic or crystalline coating, magnetic fibers, tracers detectable by magnetic resonance, tracers detectable by X-ray florescence, biomarkers, a varnish or an ink, luminescent of florescent tracers, and photochromic, thermochromic, electroluminescent and/or piezochromic compounds and/or compounds that change color on contact with one or more predetermined products.

The authenticating and/or identifying element(s) indicated above can be incorporated in a coating deposited on the knitted structure 3 by for example coating or printing.

The knitted structure 3 can be produced in such a way that it is possible to authenticate and/or identify a document from a parameter in the loop structure of the structure 3 and/or by detecting an authenticating and/or identifying element present on the structure 3.

The knitted structure 3 can be completely embedded in the fibrous layer 2, as can be seen in FIG. 4.

Figure 16:
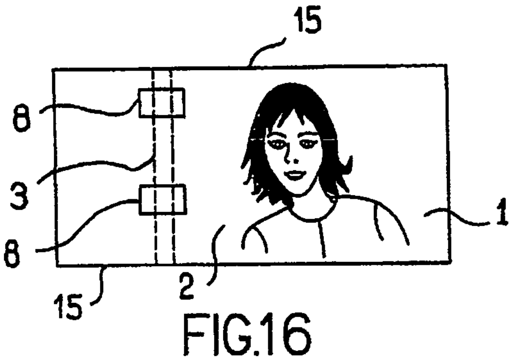

In a variant, as shown in FIG. 5, the structure 3 is at least partly flush with one face 4 of the document 1, for example to create a relief detectable to the touch or to allow the structure 3 to be observed visually, in order for example to see the stitches or a surface coating deposited on at least one yarn of the structure. In another variant, as shown in FIGS. 6 and 16, the structure 3 is partially embedded in the fibrous layer 2 in such a way as to exhibit alternating embedded and exposed portions. For this purpose the fibrous layer 2 may comprise regions 8, such as indentations forming windows in which portions of the structure 3 are exposed. The fibrous layer 2 may if desired comprise humps 9, shown in broken lines in FIG. 6, situated between the regions 8.

The stitches selected may be used to authenticate and/or identify a document, owing for example, to the texture created. For example, one bank note denomination may comprise a knitted structure with one pattern of stitches, such as full cardigan rib, as shown in FIG. 7, and a second denomination comprises a structure with a second pattern of stitches, different from the first, such as purl, as shown in FIG. 9.

The yarns of the structure 3 may also have interlacings whose arrangement forms a code detectable by a specific, e.g. optical, detector.

The structure 3, once incorporated in the fibrous layer 2, may create on at least one outer face 4 of the document 1, and especially on both faces, a region 7 having a texture detectable to the eye and/or touch, as illustrated in FIG. 4.

The texture of the region 7 may be more or less pronounced depending on the thickness of the structure 3. The structure 3 may have a thickness of for example less than 50 μm, e.g. of between approximately 30 μm and 40 μm, for a total greater thickness of the sheet material for example.

The structure 3 can also be used simply in order to improve the mechanical strength of the fibrous layer 2 and may comprise no specific authenticating and/or identifying element, in which case the structure 3 preferably extends across the whole of the document 1, and need not necessarily introduce a relief pattern detectable to the touch on the surface of the sheet material.

In the examples described above, the structure 3 is knitted. In accordance with other aspects of the present invention, the structure 3 can be replaced by a structure 3' which is woven, as shown in FIG. 10. The woven structure 3' may or may not contain authenticating and/or identifying elements, being made from yarns which may or may not be of varying types.

In the example shown in FIG. 1, the structure 3 extends across a relatively narrow width between two opposite edges 15 of the document 1.

In a variant, the structure 3 or 3' may extend across a greater width, as shown in FIG. 11, to cover for example a folding region of the document 1. In the example of a bank note the folding region may lie in a central region.

In another variant, the structure 3 or 3' may extend across the entire surface of the document 1, as illustrated in FIG. 1, as a mechanical reinforcement across the whole area of the document.

A sheet material according to the invention may comprise a number of structures 3 or 3' greater than or equal to two. As shown in FIG. 13, the document 1 may comprise three structures 3 or 3', a first structure occupying a central region and the other two extending along two opposite edges of the document 1. The two structures situated at the edges may each correspond for example to half of a wider structure cut in two when the document 1 is cut to its final dimensions.

The structure 3 or 3' can be incorporated in the sheet material in a number of different ways.

FIG. 14 is a partial and schematic view of a papermaking machine with a round mold. This machine comprises a tank 15 containing a suspension 16 of fibers, e.g. cellulose fibers and/or cotton linters and/or synthetic and/or artificial fibers, in which there is partially submerged a rotating canvas cylinder 17 defining a surface 18, on contact with which the fibrous layer 2 forms continuously.

The knitted structure 3 or woven structure 3' can be incorporated in the fibrous layer 2 during its formation. If the fibrous layer 2 includes humps 9 as described earlier, the cylinder 17 may include reliefs 13, indicated by broken lines in FIG. 14, these reliefs 13 taking the form, for example, of humps on the cylinder 17 or that of one or more masks.

FIG. 15 illustrates a method of incorporating a knitted or woven structure into a sheet material in accordance with another example of how the invention may be implemented.

In this method, a first stream of paper 20 is formed on contact with a first surface 21 of a cylinder 22 submerged in a fibrous dispersion.

The first stream 20 is drawn off towards a second cylinder 24 submerged in a second fibrous dispersion, while a second stream of paper 20 is formed on contact with a surface 25 of this second cylinder 24. A knitted structure 3 or woven structure 3' is fed in between the first and second streams of paper between the cylinder 24 and a draw-off cylinder 27 in such a way as to allow the structure to be incorporated between the two paper streams.

The invention is of course not limited to the examples of embodiments described above.

For example, the structure 3 or 3' may be embedded in the fibrous layer 2 without creating a texture on the surface of the sheet material.

Figure 17:
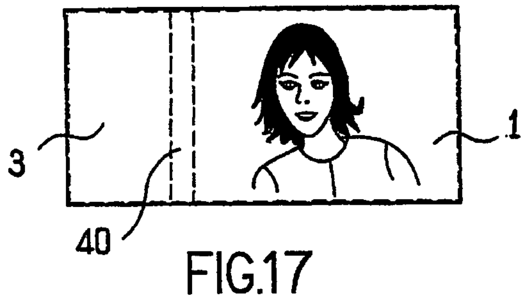

The structure 3 may be knitted in such a way as to form on a portion of its area, a pattern 40, such as a pattern having the appearance of a strip, as illustrated in FIG. 17.

In the example in question, the structure 3 occupies the entire area of the document 1. In a variant, the structure 3 occupies only a portion of the area of the document.

The yarn or yarns from which the pattern 40 is knitted may differ in type and/or appearance, for example color, from the yarn or yarns from which those parts of the structure 3 which are outside of the pattern 40 are knitted.

The pattern 40 may for example be knitted with a different stitch from that used in those parts of the structure 3 which are outside of the pattern 40.

Figure 18:
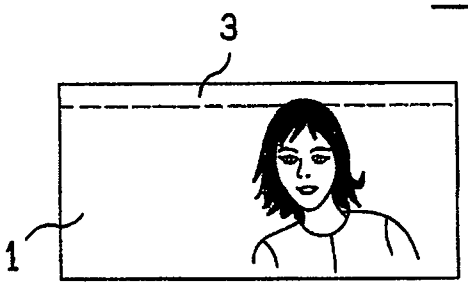
Figure 19:

As illustrated in FIGS. 18 and 19, the document 1, which may for example be rectangular, may comprise a knitted structure 3 in the form of a strip running along a long side of the rectangle (FIG. 18) or along a short side (FIG. 19).

Figure 20:
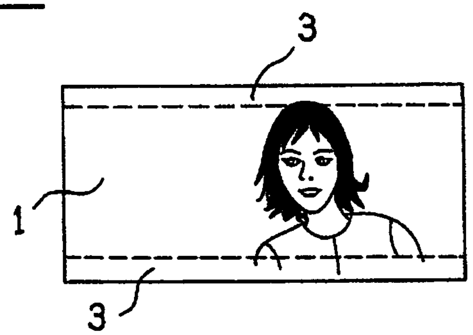
Figure 21:
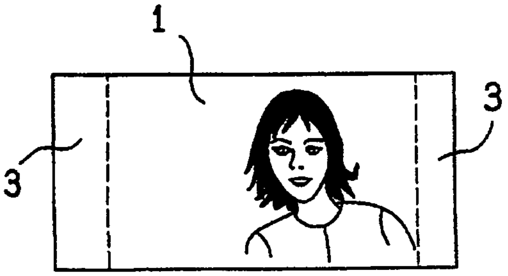

In a variant shown in FIGS. 20 and 21, the document 1 comprises two knitted structures 3 in the form of strips running either along the two long sides of the rectangle (FIG. 20) or along two short sides of the rectangle (FIG. 21).

Throughout the description, including the claims, the expression "comprising a" must be interpreted as synonymous with the expression "comprising at least one", unless the contrary is specifically stated.

The invention claimed is:

1. A sheet material, made of paper, incorporating at least one knitted structure, the structure comprising at least two yarns made of different materials, the knitted structure being at least partly embedded in a fibrous layer of the sheet material and having stitches large enough to allow fibers of the fibrous layer to penetrate through the stitches;

wherein:

the stitches of the structure form voids having an area of at least 0.1 $mm^2$ when the structure is flat and observed from above;

the knitted structure exhibits, before incorporation into the sheet material, an elongation of between about 1% and about 5%, in a direction substantially parallel to a longitudinal axis of the structure; and the structure comprises at least one authenticating and/or identifying element, carried by at least one yarn of the knitted structure.

2. The material of claim 1, wherein the structure comprises at least one plastic yarn.

3. The material of claim 1, wherein the structure comprises at least one metal or alloy yarn.

4. The material of claim 1, wherein the knit is plain knit, single rib, full cardigan rib, half-cardigan rib, variure, guilloché knit, “8-lock” knit, interlock, weave-knit, jacquard knit or purl knit.

5. The material of claim 1, wherein the structure is configured to create on at least one outer face of the sheet material a texture that is perceptible to the eye and/or touch.

6. The material of claim 1, wherein the structure comprises at least one fluorescent or phosphorescent yarn.

7. The material of claim 1, wherein the structure comprises at least one magnetic yarn.

8. The material of claim 7, wherein the structure comprises at least one magnetic yarn having properties of soft magnetism.

9. The material of claim 1, wherein the structure is knitted in such a way as to display at least one design, a logo or a text.

10. The material of claim 1, wherein the structure is knitted with at least five yarns.

11. The material of claim 1, wherein the knitted structure has a thickness less than or equal to that of the sheet material.

12. The material of claim 11, wherein the knitted structure has a thickness less than or equal to about 100 μm.

13. The material of claim 1, wherein the structure has a width of less than 50 mm.

14. The material of claim 1, wherein the structure is at least partly heat-set.

15. The material of claim 1, wherein the knitted structure comprises a coating that at least partly covers the knitted structure.

16. The material of claim 15, wherein the coating comprises an adhesive.

17. The material of claim 16, wherein the coating comprises a heat-sealable varnish.

18. The material as claimed in claim 15, wherein the coating comprises particles.

19. The material of claim 18, wherein the particles comprise magnetic particles and/or pigments.

20. The material as claimed in claim 15, wherein the knitted structure comprises an ink.

21. The material of claim 20, wherein the coating contains at least one luminescent, fluorescent, photochromic, thermochromic electroluminescent and/or piezochromic compound.

22. The material of claim 1, wherein the structure comprises at least one portion embedded in at least one layer of the sheet material and at least one exposed portion.

23. The material as claimed in claim 1, wherein the structure is completely embedded in the sheet material.

24. The material as claimed in claim 1, wherein a full length of the structure is flush with an outer face of the sheet material.

25. The material of claim 1, wherein the structure is narrower than the sheet material.

26. The material of claim 1, wherein the structure extends from a first edge of the sheet material to a second edge opposite the first edge.

27. The material of claim 1, wherein the material incorporates a single knitted structure.

28. The material of claim 1, wherein the material incorporates at least two knitted structures.

29. The material of claim 1, wherein the material incorporates a first knitted structure in a central region and second and third knitted structures substantially parallel to the first knitted structure and extending along two opposite edges of the sheet material.

30. The material of claim 1, wherein the voids have an area of at least 5 $mm^2$ when the structure is flat and observed from above.

31. The material of claim 1, the knitted structure extending in a folding area of the material.

32. The material of claim 1, wherein the structure comprises a succession of alternately embedded and exposed portions.

33. A document comprising a sheet material as defined in claim 1.

34. The document of claim 33 being one of the following: a bank note; an identity paper; a driver’s license or a pass; a page or cover of a passport; a visa; a coupon; a valuable document other than a bank note; a protective and/or authenticating label; a traceability label; and an admission ticket for a cultural or sporting event.

35. A printing substrate comprising a sheet material as claimed in claim 1.

36. A knitted structure configured to be incorporated at least partly within a sheet material, the structure being in the form of a strip and comprising at least two yarns made of different materials and at least one authenticating and/or identifying element, wherein the authenticating and/or identifying element comprises at least one of the following elements:

a falsification-evident element;

an element producing a variable optical effect by interference and/or diffraction or iridescence or by liquid crystals;

a magnetic or crystalline coating;

magnetic fibers;

tracers detectable by magnetic resonance;

tracers detectable by X-ray florescence;

biomarkers;

a varnish or ink;

luminescent, fluorescent or phosphorescent tracers; and photochromic, thermochromic, electroluminescent and/or piezochromic compounds and/or compounds that change color on contact with one or more predetermined products;

the knitted structure being at least partly embedded in a fibrous layer of the sheet material and having stitches large enough to allow fibers of the fibrous layer to penetrate through the stitches;

wherein:

the stitches of the structure form voids having an area of at least 0.1 $mm^2$ when the structure is flat and observed from above;

the knitted structure exhibits, before incorporation into the sheet material, an elongation of between about 1% and about 5%, in a direction substantially parallel to a longitudinal axis of the structure; and the structure comprises at least one authenticating and/or identifying element, carried by at least one yarn of the knitted structure.

37. The knitted structure of claim 36, wherein the falsification-evident element is visible and/or detectable with the aid of a specific detector.

38. The knitted structure of claim 36, comprising at least one fluorescent or phosphorescent yarn.

39. A sheet material, made of paper, comprising at least one knitted structure comprising at least two yarns differing in size and/or shape and/or optical, physical or chemical properties, the knitted structure exhibiting, before being incorporated in the sheet material, an elongation of at least approximately 3% in a direction substantially parallel to a longitudinal axis of the structure, the knitted structure being at least partly embedded in a fibrous layer of the sheet material and having stitches large enough to allow fibers of the fibrous layer to penetrate through the stitches;

wherein:

the stitches of the structure form voids having an area of at least 0.1 $mm^2$ when the structure is flat and observed from above; and the structure comprises at least one authenticating and/or identifying element, carried by at least one yarn of the knitted structure.

40. The sheet material of claim 39, wherein the structure comprises at least one fluorescent or phosphorescent yarn.

41. A sheet material, made of paper, incorporating at least one knitted structure made with at least two different forms of loop, the structure comprising at least one authenticating and/or identifying element, the knitted structure being at least partly embedded in a fibrous layer of the sheet material and having stitches large enough to allow fibers of the fibrous layer to penetrate through the stitches;

wherein:

the stitches of the structure form voids having an area of at least 0.1 $mm^2$ when the structure is flat and observed from above;

the knitted structure exhibits, before incorporation into the sheet material, an elongation of between about 1% and about 5%, in a direction substantially parallel to a longitudinal axis of the structure; and the structure comprises at least one authenticating and/or identifying element, carried by at least one yarn of the knitted structure.

42. The material of claim 41, wherein the knitted structure comprises at least two yarns made of different materials.

43. The sheet material of claim 41, wherein the structure comprises at least one fluorescent or phosphorescent yarn.

44. A sheet material, made of paper, incorporating at least one knitted structure extending across the whole area of the sheet material, the structure being knit in such a way as to form at least one design and comprising at least two yarns made of different materials, the knitted structure being at least partly embedded in a fibrous layer of the sheet material and having stitches large enough to allow fibers of the fibrous layer to penetrate through the stitches;

wherein:

the stitches of the structure form voids having an area of at least 0.1 $mm^2$ when the structure is flat and observed from above;

the knitted structure exhibits, before incorporation into the sheet material, an elongation of between about 1% and about 5%, in a direction substantially parallel to a longitudinal axis of the structure; and the structure comprises at least one authenticating and/or identifying element, carried by at least one yarn of the knitted structure.

45. The sheet material of claim 44, wherein the structure comprises at least one fluorescent or phosphorescent yarn.

46. A sheet material of substantially rectangular shape, made of paper, incorporating at least one knitted structure extending along one large side of the sheet and comprising at least two yarns made of different materials, the knitted structure being at least partly embedded in a fibrous layer of the sheet material and having stitches large enough to allow fibers of the fibrous layer to penetrate through the stitches;

wherein:

the stitches of the structure form voids having an area of at least 0.1 $mm^2$ when the structure is flat and observed from above;

the knitted structure exhibits, before incorporation into the sheet material, an elongation of between about 1% and about 5%, in a direction substantially parallel to a longitudinal axis of the structure; and the structure comprises at least one authenticating and/or identifying element, carried by at least one yarn of the knitted structure.

47. The sheet material of claim 46, wherein the structure comprises at least one fluorescent or phosphorescent yarn.

48. The sheet material of claim 46 incorporating two knitted structures extending along two respective parallel large sides of the sheet.

* * * * *